Sept. 29, 1936.  F. PETTY ET AL  2,055,632
TILLING IMPLEMENT
Filed July 21, 1934  4 Sheets-Sheet 1

Frank Petty
Herbert Petty
INVENTORS
their ATTY.

Sept. 29, 1936.　　　F. PETTY ET AL　　　2,055,632
TILLING IMPLEMENT
Filed July 21, 1934　　　4 Sheets-Sheet 2

Frank Petty
Herbert Petty
INVENTORS
By Otto Munk
their ATTY.

Sept. 29, 1936.  F. PETTY ET AL  2,055,632
TILLING IMPLEMENT
Filed July 21, 1934  4 Sheets-Sheet 3

Frank Petty
Herbert Petty
INVENTORS

Frank Petty
Herbert Petty
INVENTORS

Patented Sept. 29, 1936

2,055,632

UNITED STATES PATENT OFFICE 2,055,632

TILLING IMPLEMENT

Frank Petty, Mitcham, Victoria, and Herbert Petty, Doncaster, Victoria, Australia Application July 21, 1934, Serial No. 736,296
In Australia July 24, 1933

11 Claims. (Cl. 97—53)

This invention has amongst its purposes efficient plowing of land in orchards, where land between trees is part of that which requires to be plowed, our implement being steerable by a driver both into and out from spaces between the trees.

The frame of our implement is adapted for carrying plow discs, or other tilling members as cultivator tines, and the members so carried can be adjusted before plowing begins and can be raised and lowered during plowing. They are also able to rise and fall to some extent as they advance as the result of meeting obstructions such as stones and roots. Instead of discs shovels may be fitted, as for irrigation channelling.

There is in practice this difference between a steerable plow of the kind here described, and a cultivator, that in the former case not only must the implement frame be more compact and strong, but it must allow for the exertion of greater force by the plowman for steering the implement, the resistance of soil to deep set discs and soil cutting steering wheels being comparatively considerable.

It is a further object of this invention to provide a four wheeled frame with the driver's seat at its rear; and with hand steering levers, one for each hand, and not located adjacent to one another, but spaced widely apart so that the full power of both hands can be exerted on them simultaneously, and in order to enable additional power to be exerted by the plowman at the same time, there is a pedal lever. Only sometimes, however, will more than one lever be operated at one time. By the use of one or more of these levers the transport wheels are steered to determine the course of the implement. Other levering devices are provided so that, while travelling, the driver can raise or lower the discs. He would raise them, for example, at times, when changing the direction of travel.

In order that the disc height relatively to the implement frame may be adjustable, we make the disc carriers adjustable, and these carriers, which include draft beams or bars, can, where they carry the discs, float, that is rise and descend during plowing without having to be manually controlled. Thus the implement surmounts and passes various stones, small stumps, and patches of hard soil which the discs encounter.

The implement herewith illustrated is to be animal drawn, but it could be tractor drawn, or could carry a motor to drive it.

Our invention is illustratively exemplified in the accompanying drawings in which:

Figure 7 is a plan, and Figure 8 a side view, in which all the said wheels are directed to the right, to deviate the course in that direction, to cultivate between trees on the right, for example.

Figure 9 is a plan and Figure 10 a side view, in which the front and rear wheels are directed to the left, to cause the implement to so deviate.

Figures 11 and 12 show, in plan and side view respectively, the front wheels directed to one side, and the rear wheels to the other side, to alter the course as indicated by an arrow.

Figure 13 is a plan, and Figure 14 a side view, in which the front wheels are directed to the right, and the rear wheels straight forward, so that the course alters as indicated by an arrow.

Figure 1:
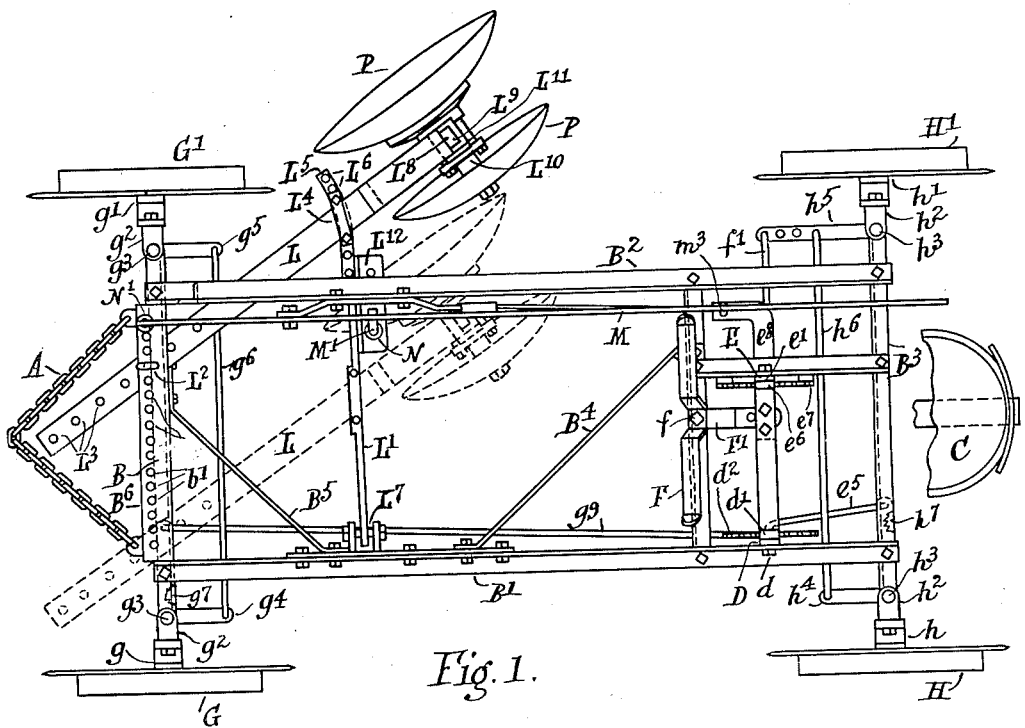
Figure 1 is a plan of one of our plows.

The implement has any suitable draft device, represented by chains A, attached at suitable points to a channel iron or like suitable frame, marked B in front, $B^1$, $B^2$, at the sides, and $B^3$ at the rear, this frame being suitably stiffened—some braces, $B^4$, $B^5$, being shown. The plow frame is set high, where it has under it space for parts herein described—see part $B^2$.

C represents the driver's seat. There is, convenient to the left hand of the plowman when he is seated, a steering lever D; and well away from that lever—towards the other side of the frame—and convenient to the plowman's right hand there is a steering lever E.

We supplement the hand levers by a steering pedal F, in front of the seat, because the application of considerable power may be beneficial to overcome resistances to progress which may be encountered as the plow is advancing. It may be noted that the plowman must also use one or more hands to drive the horses when these are used to draw the implement.

The main frame carries front coupled steerable ground wheels G, G¹, and rear coupled steerable ground wheels H, H¹. Devices are provided to counteract side slip of the implement; for example, the said wheels have thin edges which enter the ground, and resist tendency of the tilling discs or members to produce displacement sideways. Respective wheel axles are marked $g$, $g^1$, $h$, $h^1$, but lubrication means are not shown as such are well known.

The said axles are attached to yokes $g^2$, $h^2$, pivoted on the implement frame by bolts $g^3$, $h^3$; and arms $g^4$, $g^5$, $h^4$, $h^5$ extend from the yokes, pairs of these arms being connected to respective rods, $g^6$, $h^6$, so that each pair of wheels is coupled. A front yoke has an extension arm $g^7$ and a rear yoke an extension arm $h^7$, with, in each case, a lever connection undermentioned.

The lever D—provided for operation by the left hand—has connections by which to control, if so required, front wheels only; it is pivoted to the implement frame at $d$, and connected at any suitable point, $g^8$, to a rod $g^9$, the fore end of which is connected to the arm $g^7$, movement of which steers the front wheels. $d^1$ on lever D is a spring tooth to, when required, engage a holding rack $d^2$.

Lever E, provided for operation by the right hand has connections which enable it to be used to steer the rear ground wheels; it is pivoted at $e^1$ to framing, and has a lateral extension $e^2$ fixed to a member $e^3$ which is pivoted to the implement frame at $d$, and which has one end integral with the rack $d^2$. The other end is connected by a link $e^5$ to the extension arm $h^7$, movement of which steers the rear wheels. To temporarily fix the lever E it has a spring tooth $e^6$ adapted to engage a rack $e^7$. Suitable known means (not shown) are provided to keep the spring tooth of each hand lever disengaged when required. It is obvious that the hand lever on the left could similarly be adapted to steer the rear wheels and the right hand lever the front wheels, but the arrangement illustrated has some practical advantages.

The pedal bar F is pivoted to the frame at $f$, and has a projection F¹ to which connects a rod $f^1$ which extends to an arm $h^5$ projecting from the rear wheel coupling.

Figure 2:
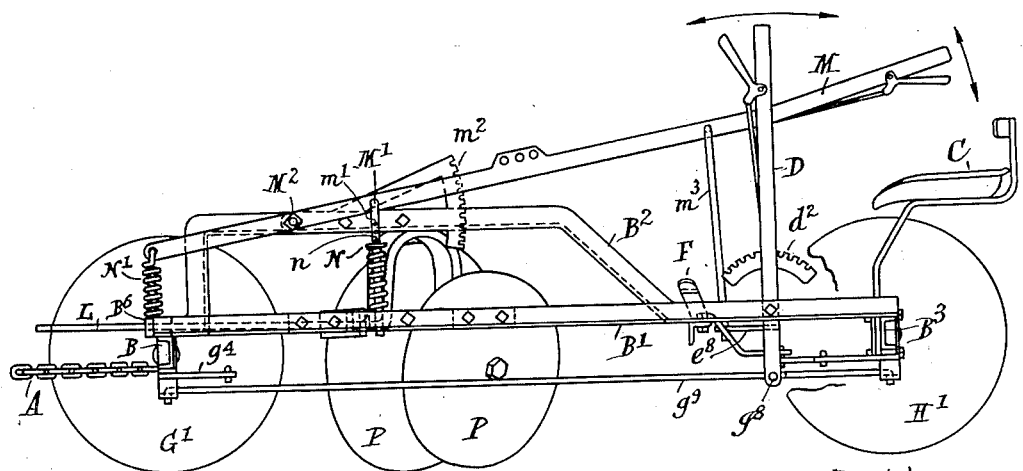
Figure 2 is a side elevation of said plow showing the near wheels removed.
Figure 4:
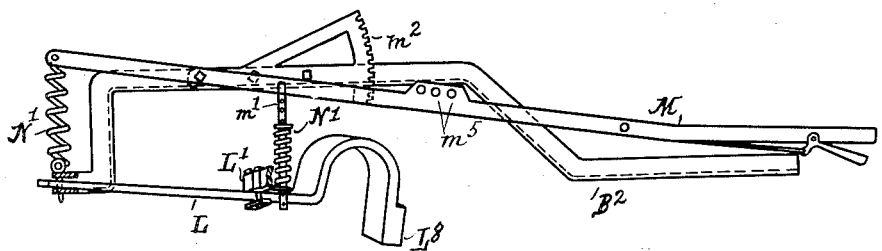
Figure 4 shows, in side elevation, parts of the plow frame with an adjustable beam and its control devices.
Figure 5:
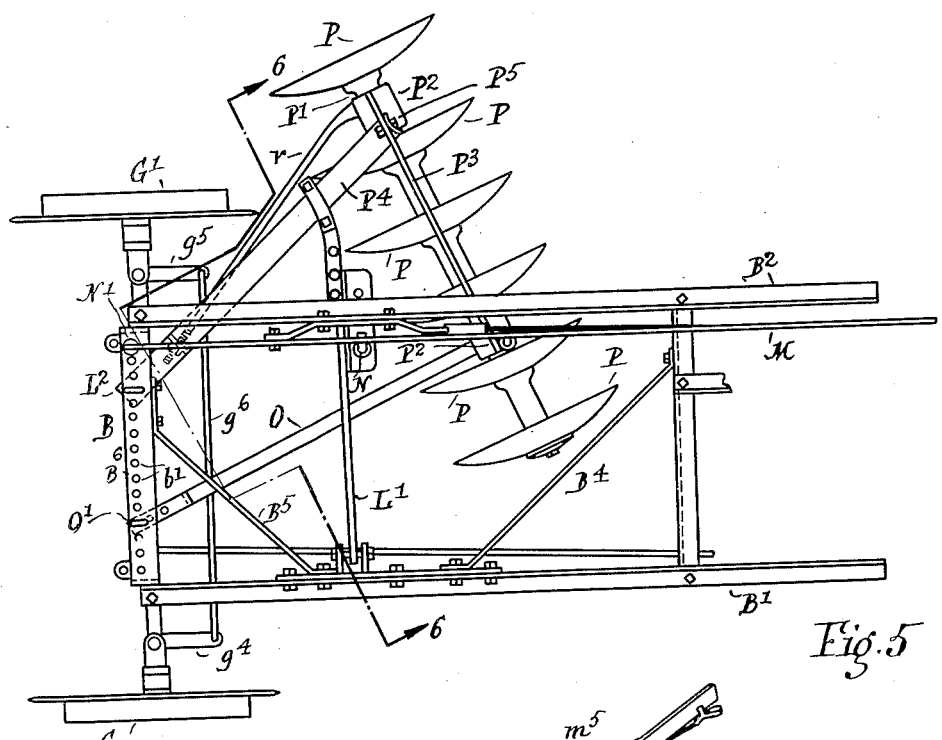
Figure 5 is a plan of part of a plow fitted with numerous discs, all of which are adjustable as a set.
Figure 6:
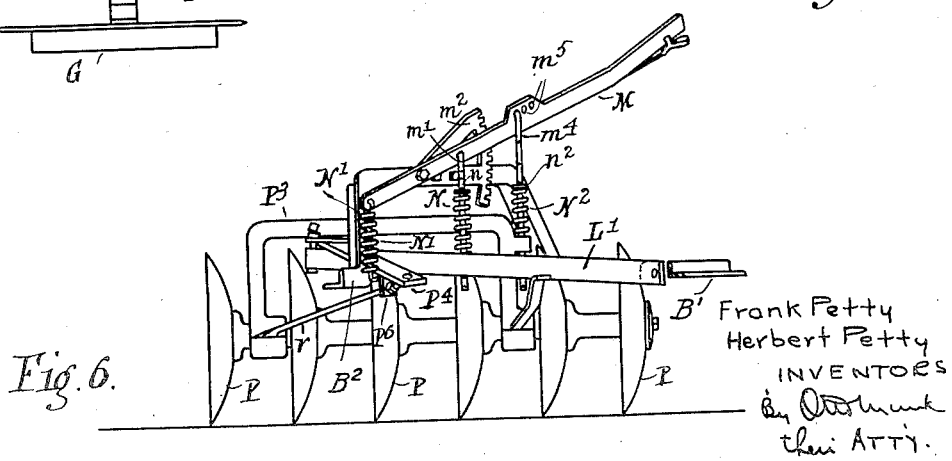
Figure 6 is a sectional view of parts on line 6 in Figure 5.

The disc carrier size and details may vary, a small one being illustrated in Figures 1, 2 and 4, and a larger heavier one in Figures 5 and 6. Each of these carriers is of the kind which changes its height as the discs supported by said carrier are affected by meeting stones and small stumps, so that the discs rise and ride over these obstacles. Lever devices are also provided as described herein by which the carrier and its discs may be deliberately raised or be pressed down by the plowman's action.

For draft purposes, each disc carrier has suitable connections; thus in Figures 1 and 2, L is an adjustable beam a part of which engages a supporting stay bar L¹. The beam fore part is movably connected to the implement frame, a pin L² being shown passing through one of a series of beam holes L³, and through appropriate holes, of a series $b^1$ on the framing, an apertured member B⁶ of which is shown.

Near its disc end beam L enters a slot L⁴, or the like in a suitable part of an end L⁵ of the stay L¹ which contains holes L⁶ to allow of adjustment of said beam, to receive holding means, shown as bolts, one at each side of the beam. Stay L¹ is shown supported at one end L⁷ it being pivoted to the framing, its disc end being thus left capable of rising and descending as required. The plowman can regulate, relatively to the implement frame, the position of the discs, before starting, but there will still be a rising and falling effect during plowing. The beam L, in Figures 1 and 4, is arched at its disc end, and has a plug L⁸ which enters a socket or bolt-enclosed adjustable space L⁹ in the disc carrier L¹⁰. The discs can be set in inclined position and to hold them so, it would suffice to insert a wedge L¹¹ to a suitable depth in socket L⁹.

The means shown to enable normal depth of tillage by the discs to be regulated is a lever M which can be set prior to plowing, and can—if desired—be adjusted during plowing. When this lever is depressed it makes the discs cultivate more deeply, and when it is raised, shallower plowing results; or the discs can be raised so high that they will be above ground.

A lug L¹² projects from the stay L¹ and has a positioning hole, accommodating the base of a stem M¹, a part of which is encircled by a spring N, see Figure 4, the stem head being secured to lever M. This spring is between and presses the lug L¹² and a stop $n$, which is shown as an adjustable pin which can be set in one or other of several stem holes $m^1$. Any movement of lever M which depresses stop $n$ also compresses the spring, and transmits downward pressure to stay L¹ and thus to the discs. If the discs rise on reaching impediments they descend after passing the impediments, the descent being aided by expansion of the spring device.

There is a frontal spring N¹, shown between the implement frame and lever M, to assist in the movement of that lever—which is pivoted at a suitable point M² to framing—when it is raising the discs and their framing. This spring normally tends to depress the lever front and to raise that part of the lever which carries stem M¹. So this supplemental springs acts as a shock absorber to some extent when the discs and their carrying frame undergo upward impulses. This spring aids in keeping down the frame front.

We provide in some cases, means which are shown in Figure 2, to connect the steering means with lever M. $e^8$ is an arm connecting bar $e^2$ with a link $m^3$ which is coupled to lever M there being usable any disconnecting means. When a steering means is in use the link $m^3$ is thus caused to actuate lever M, and thus affect the discs. Provided levers D and E be locked so that they move together, lever E can be actuated to move lever M and alter the working depth of the discs simultaneously with the effecting of steering. The said connections, $e^8$, $m^3$, are most appropriate when relatively few discs are carried.

The plowman can hold lever D against movement, leaving rack $d^2$ free, when the latter is to be so movable, as in cases herein described.

A gang of numerous discs P is shown in Figures 5 and 6 mounted on a shaft P¹ which has bearings P² supporting a yoke or bridge P³. An adjustable steadying member, shown as a bar O in Figure 5, connects the yoke to a suitable part of the implement frame, as at its front B, at some selected point O¹—a holding member being shown as a pin passed through one of the holes $b^1$. To the yoke, the stay L¹, and a beam P⁴, are attached. Beam P⁴ is, as described with reference to beam L, passed through a slot in stay L¹ and pinned to the implement frame at a selected point L². Beam P⁴ is secured to a part P⁵ of yoke P³. $r$ is a rod the front end of which is connected to part of beam $P^4$ which is shown with a lug $P^6$ to which the screwthreaded end of that rod is nutted. The rear of this rod is shown attached to bearing $P^2$ and assists in steadying the disc carriage.

In some cases a spring $N^2$ is added, encircling a stem $m^4$ which is attached to lever M, as by engaging a hole or one of a series of holes, $m^5$, in that lever, this stem having a guide which is shown as a hole in bridge $P^3$. The ends of this auxiliary spring $N^2$ press respectively the bridge, and a stop $n^2$ shown as an adjustable pin on the stem, so that the spring offers suitable resistance to such upward pressure as the adjacent disc framing and discs may produce. This opposes a rising tendency which may be exhibited by those discs of the series which are inward of the framing, as opposed to the tendency of outer discs of the series to work downwards. The spring resistance yields however when upward pressure becomes specially strong, and thus does not prevent necessary disc movements aforesaid. Springs N, $N^1$, $N^2$, may obviously be given various suitable positions.

By adjusting the means of carriage of the discs relatively to the line of travel of the implement frame the working angle of each disc relatively to the soil can obviously be regulated.

Since it is known that discs of a series of discs need not all be of the same diameter, and that reversible discs can be used, we make no further reference to such features.

Figure 15:
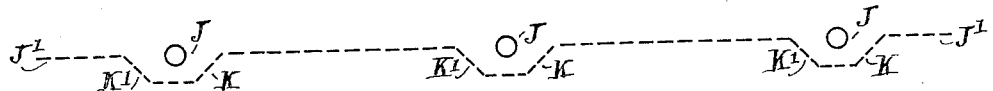
Figure 15 is a sketch plan of one course along which our plow may be steered.

In Figure 15, posts or trees are indicated at J; $J^1$ indicates one course the implement may take. K, $K^1$, show parts where the course diverges to the left and right respectively.

Figure 3:
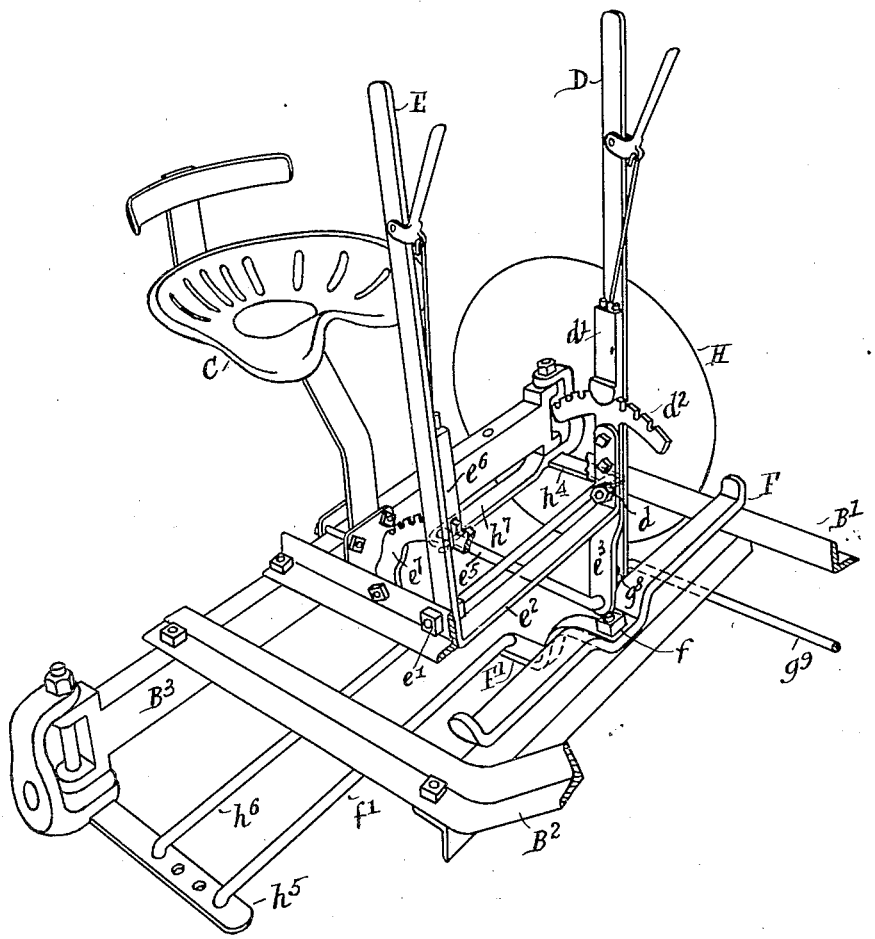
Figure 3 is a perspective view of parts of the plow in the vicinity of the seat.

To allow the implement to travel straight forward, levers D and E are, as in Figure 3, neither advanced nor retracted.

As the plowman drives he will—see Figure 3— in order to steer the front and rear ground wheels simultaneously, cause rack $d^2$ on member $e^3$ to be engaged by tooth $d^1$ of lever D, if he also wishes levers D, E, to be locked together to move simultaneously when either is manipulated. When lever D is locked to rock $d^2$, there is a series of connected parts $h^6$, $h^4$, $h^5$, $e^5$, $d^2$, $d^1$, lever D, and rod $g^9$.

Figure 9:
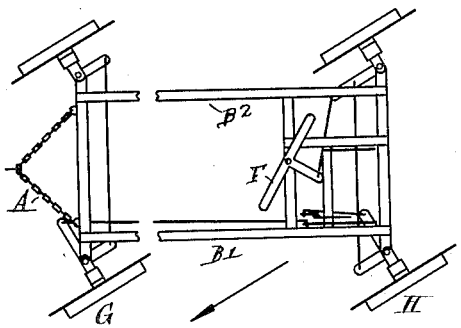
Figures 7 to 14 are on a smaller scale, and show diagrammatically a plow having steering wheel positions produced from time to time according to the path of travel.
Figure 10:
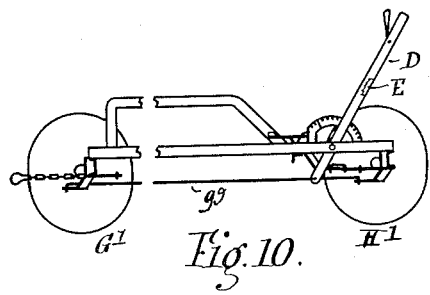

To deviate to the left—see Figures 9 and 10— handles of levers D, E, are retracted by the driver: or if the resistance by the implement to steering is such that it can be overcome by actuating lever E, which moves the connected parts, the plowman can use that pedal.

Figure 7:
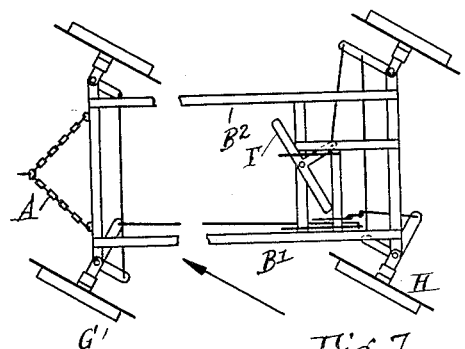
Figure 8:
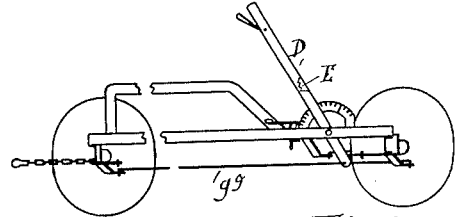

To deviate to the right—see Figures 7 and 8— the driver advances the handles of levers D, E, the tooth of the latter E being disengaged. In this case pressure by a foot against the appropriate end of the pedal increases the force applied to effect the steering.

Figure 13:
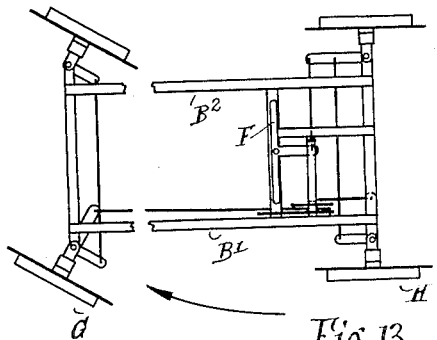
Figure 14:
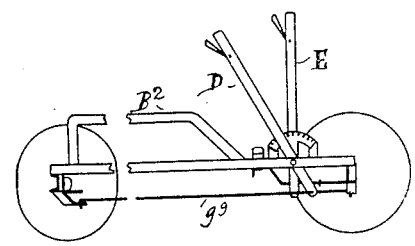

To curve the course of travel as indicated in Figures 13, 14, the plowman advances lever D— its spring tooth being disengaged—and may retain lever E locked in central position. He thus steers the front wheels to one side, and keeps the rear wheels directed forward.

Figure 11:
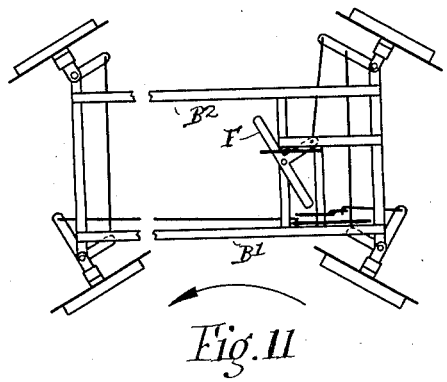
Figure 12:
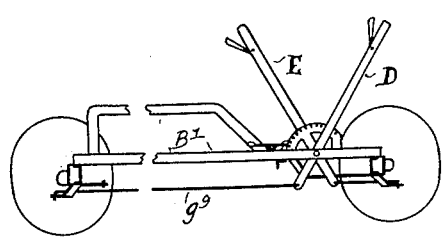

To curve the course to the left as indicated in Figures 11 and 12, the handle of lever D is retracted, and that of lever E advanced, the spring tooth of each being disengaged.

When plowing an irregular course, partly between trees and partly out from them, and when plowing upon hillsides, the plowman may take into consideration the facts that the discs displace soil laterally, and that the direction of such displacement may be important relatively to the positions of trees, of their upper roots, and to the soil contour.

The plowman can usually lift the discs simultaneously with steering even when he operates only one lever.

We claim:—

1. A tilling implement the frame of which carries a driver's seat, steerable pairs of wheels supporting the frame front and rear respectively, two levers one of which is located at one side of the seat and in the forward vicinity of one hand of the seated driver said lever having connections to steer the front wheels, the other lever being located at the other side of the seat and in the forward vicinity of the driver's other hand and having connections to steer the rear wheels, means by which the driver may connect said levers, so that all the wheels will be steered simultaneously when either lever is operated, with pedal lever devices operatable by the driver and having connections to steer the rear wheels, said pedal also having means whereby the driver can connect it with the front wheels, and steer both the front and the rear wheels by pedal operation.

2. A tilling implement having steerable ground wheels supporting its frame front and rear, a lever arranged to steer the front wheels, another lever arranged to steer the rear wheels, means to connect said levers whereby by manipulating either lever all the wheels become steerable simultaneously, a pedal lever with connections to steer the rear supporting means and with means to connect with or disconnect from the front supporting means, whereby on effecting the last named connection the pedal lever can be actuated by the driver to steer all the wheels.

3. A tilling implement having a driver's seat, a frame carried by front and rear steerable ground wheels which are thin edged for soil entry so as to oppose side slip; a left hand side hand lever, a right hand side hand lever, and a pedal lever, all said levers being located forward of the driver, and each lever having connections to wheels for steering the implement, power being applicable by the driver to all the levers simultaneously.

4. A plow having a frame, tilling discs, a driver's seat, front wheels coupled to be steered in unison, rear wheels coupled to be steered in unison, devices including a hand lever to steer said front wheels, devices including another hand lever to steer said rear wheels, one of said levers being located at one side of the seat and in the vicinity of the driver's forwardly extended left hand while he is seated and the other lever being located at the other side of the seat and in the vicinity of the driver's forwardly extended right hand, and carrying an adjustable draft means which at its rear supports tillage discs located partly or wholly outside the frame on one side according to the adjustment, said draft means extending obliquely of the frame and having its fore part supported in adjusted position at the frame front.

5. A plow having a frame, tilling discs, a driver's seat, front wheels coupled to be steered in unison, rear wheels coupled to be steered in unison, devices including a hand lever to steer said front wheels, devices including another hand lever to steer said rear wheels, one of said levers being located at one side of the seat and in the vicinity of the driver's forwardly extended left hand while he is seated and the other lever being located at the other side of the seat and in the vicinity of the driver's forwardly extended right hand, and carrying an adjustable draft means which at its rear supports tillage discs partly or wholly outside the frame on one side according to the adjustment, said draft means extending obliquely of the frame and having its fore part supported at the frame front, a stay connected to said draft means to raise and lower the latter, said draft means and stay being able to yield to upward pressure so as to allow the discs to automatically ride over impediments.

6. A plow having a frame, tilling discs, a driver's seat, front wheels coupled to be steered in unison, rear wheels coupled to be steered in unison, devices including a hand lever to steer said front wheels, devices including another hand lever to steer said rear wheels, one of said levers being located at one side of the seat and in the vicinity of the driver's forwardly extended left hand while he is seated and the other lever being located at the other side of the seat and in the vicinity of the driver's forwardly extended right hand, and carrying an adjustable draft means which at its rear supports tillage discs partly or wholly outside the frame on one side according to the adjustment, said draft means extending obliquely of the frame and having its fore part supported at the frame front, a stay connected to said draft means to raise and lower the latter, said draft means and stay being able to yield to upward pressure so as to allow the discs to automatically ride over impediments, the frame carrying a hand lever connected with the stay to adjust the latter higher or lower and thus regulate the working depth of the discs.

7. A plow having a frame, tilling discs, a driver's seat, front wheels coupled to be steered in unison, rear wheels coupled to be steered in unison, devices including a hand lever to steer said front wheels, devices including another hand lever to steer said rear wheels, one of said levers being located at one side of the seat and in the vicinity of the driver's forwardly extended left hand while he is seated and the other lever being located at the other side of the seat and in the vicinity of the driver's forwardly extended right hand, and carrying an adjustable draft means which at its rear supports tillage discs and extends obliquely of the frame forwardly, its fore part being supported at a selected part of the frame front, said rear being arched or gapped and having an end formed to engage a socket of a member fitted with discs between which the arch is located.

8. A tilling implement the frame of which carries a driver's seat, steerable pairs of wheels supporting the frame front and rear respectively, two levers one of which is located at one side of the seat and in the forward vicinity of one hand of the seated driver said lever having connections to steer the front wheels, the other lever being located at the other side of the seat and in the forward vicinity of the driver's other hand and having connections to steer the rear wheels, means by which the driver may connect said levers, so that all the wheels will be steered simultaneously when either lever is operated, with the tilling members floatably carried by an adjustable draft beam, an adjustable stay supporting the beam, spring means exerting downward pressure on the stay, said spring means being yieldable to allow the stay to rise when temporarily subjected to strong upward pressure by the tillage members, the draft beam and stay extending partly outside the frame at one side, and an adjustable lever carried by the frame and usable to raise or lower the stay and thereby the draft beam and tillage members.

9. A tilling implement having a frame, tilling discs, a driver's seat, front wheels coupled to be steered in unison, rear wheels coupled to be steered in unison, devices including a hand lever to steer said front wheels, devices including another hand lever to steer said rear wheel, one of said levers being located at one side of the seat and in the vicinity of the driver's forwardly extended left hand while he is seated and the other lever being located at the other side of the seat and in the vicinity of the driver's forwardly extended right hand, and with the tilling members floatably carried by an adjustable draft beam, an adjustable stay supporting the beam, spring means exerting downward pressure on the stay, said spring means being yieldable to allow the stay to rise when temporarily subjected to strong upward pressure by the tillage members, the draft beam and stay extending partly outside the frame at one side, an adjustable lever carried by the frame and usable to raise or lower the stay and thereby the draft beam and tillage members, and a supplemental spring at the frame front connected to and exerting pull on the last named lever, and keeping down said front to aid the lever when it is raising the tilling members.

10. A tilling implement having a frame, tilling discs, a driver's seat, front wheels coupled to be steered in unison, rear wheels coupled to be steered in unison, devices including a hand lever to steer said front wheels, devices including another hand lever to steer said rear wheels, one of said levers being located at one side of the seat and in the vicinity of the driver's forwardly extended left hand while he is seated and the other lever being located at the other side of the seat and in the vicinity of the driver's forwardly extended right hand, and with the tilling members floatably carried by an adjustable draft beam, an adjustable stay supporting the beam, spring means exerting downward pressure on the stay, said spring means being yieldable to allow the stay to rise when temporarily subjected to strong upward pressure by the tillage members, the draft beam and stay extending partly outside the frame at one side, an adjustable lever carried by the frame and usable to raise or lower the stay and thereby the draft beam and tillage members, and a supplemental spring at the frame front connected to and exerting pull on the last named lever and keeping down said front to aid the lever when it is raising the tilling members, a yoke extending outwardly of the frame and carrying the tilling members, and an auxiliary spring bearing on the inward part of the yoke so as during tilling to resist a rising tendency of adjacent discs whereby they would cut less deeply than discs located more outwardly.

11. A plow having a frame, tilling discs, a driver's seat, front wheels coupled to be steered in unison, rear wheels coupled to be steered in unison, devices including a hand lever to steer said front wheels, devices including another hand lever to steer said rear wheels, one of asid levers being located at one side of the seat and in the vicinity of the driver's forwardly extended left hand while he is seated and the other lever being located at the other side of the seat and in the vicinity of the driver's forwardly extended right hand, and carrying an adjustable draft means which at its rear supports tillage discs partly or wholly outside the frame on one side according to the adjustment, said draft means extending obliquely of the frame and having its fore part supported at a selected part of the frame front, a cross stay for raising and lowering said draft means, the latter having a connection with a selected part of the raisable and lowerable cross stay having a connection to the frame, said draft means and stay being yieldable to upward pressure resulting from the discs automatically riding over impediments, the frame carrying a hand lever adapted to adjust the stay higher or lower and thus regulate the working depth of the discs and means to connect the steering devices with the lever which regulates the disc positions, so that steering shall be accompanied by said regulation.

FRANK PETTY.
HERBERT PETTY.